United States Patent [19]

Goodwin, III

[11] Patent Number: 5,794,215
[45] Date of Patent: Aug. 11, 1998

[54] METHOD OF OPTIMIZING ELECTRONIC PRICE LABEL SYSTEMS

[75] Inventor: John C. Goodwin, III, Suwanee, Ga.

[73] Assignee: NCR Corporation, Dayton, Ohio

[21] Appl. No.: 748,452

[22] Filed: Nov. 13, 1996

[51] Int. Cl.$^6$ .................................................. G06F 15/16
[52] U.S. Cl. ........................... 705/26; 705/1; 705/26; 235/383; 235/383.2; 340/825.35; 340/825.49; 340/825.54; 340/825.69
[58] Field of Search ................. 705/1, 26; 235/383, 235/383.2; 364/401; 340/825.35, 825.49, 825.54, 825.69

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,821,291 | 4/1989 | Stevens et al. | 375/259 |
| 5,172,314 | 12/1992 | Poland et al. | 364/401 |
| 5,241,467 | 8/1993 | Failing et al. | 705/1 |
| 5,374,815 | 12/1994 | Waterhouse et al. | 235/383 |
| 5,532,465 | 7/1996 | Waterhouse et al. | 235/383 |
| 5,629,416 | 5/1997 | Kosarew | 364/478.13 |

*Primary Examiner*—Allen R. MacDonald
*Assistant Examiner*—Romain Jeanty
*Attorney, Agent, or Firm*—Paul W. Martin

[57] ABSTRACT

A method of optimizing electronic price label (EPL) systems which employs a three-dimensional graph of retry levels in a transaction establishment. The method includes the steps of determining locations of EPLs within the transaction establishment, determining locations of transmit and receive antennas that are used by a computer to communicate with the EPLs, determining retry levels for the EPLs, mapping the retry levels to locations within the transaction establishment, producing a three-dimensional graph of the retry levels within the area of the transaction establishment, and determining, from the graph, subareas within the area having retry levels above a predetermined maximum retry level. Once the subareas having higher retry levels are determined, the locations of the transmit and receive antennas may be changed and/or interfering structures may be moved until the retry levels of the subareas are below the predetermined maximum retry level.

6 Claims, 4 Drawing Sheets

1

METHOD OF OPTIMIZING ELECTRONIC PRICE LABEL SYSTEMS

BACKGROUND OF THE INVENTION

The present invention relates to electronic price label (EPL) systems used in transaction establishments, and more specifically to a method of optimizing electronic price label systems.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

Installation of wireless EPLs requires proper placement of transmit and receive antennas to maximize the probability that an addressed EPL will receive a message from the server. Proper placement can result in a lower EPL system cost since fewer antennas are required consistent with the need to maximize price change speeds.

Therefore, it would be desirable to provide a method of optimizing electronic price label systems.

SUMMARY OF THE INVENTION

In accordance with the teachings of the present invention, a method of optimizing electronic price label systems is provided.

The method includes the steps of determining locations of EPLs with the transaction establishment, determining locations of transmit and receive antennas that are used by a computer to communicate with the EPLs, determining retry levels for the EPLs, mapping the retry levels to locations within the transaction establishment, producing a three-dimensional graph of the retry levels within the area of the transaction establishment, and determining, from the graph, subareas within the area having retry levels above a predetermined maximum retry level. Once the subareas having higher retry levels are determined, the locations of the transmit and receive antennas may be changed and/or interfering structures may be moved until the retry levels of the subareas are below the predetermined maximum retry level.

It is accordingly an object of the present invention to provide a method of optimizing electronic price label systems.

It is another object of the present invention to provide a method of optimizing electronic price label systems which can locate areas of poor reception within a transaction establishment.

It is another object of the present invention to provide a method of optimizing electronic price label systems which can produce a three dimensional plot representing reception capability throughout a transaction establishment.

It is another object of the present invention to provide a method of optimizing electronic price label systems which maximizes reception throughout a transaction establishment while minimizing the cost of an electronic price label system.

It is another object of the present invention to provide a method of optimizing electronic price label systems which balances system cost against price change frequencies.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
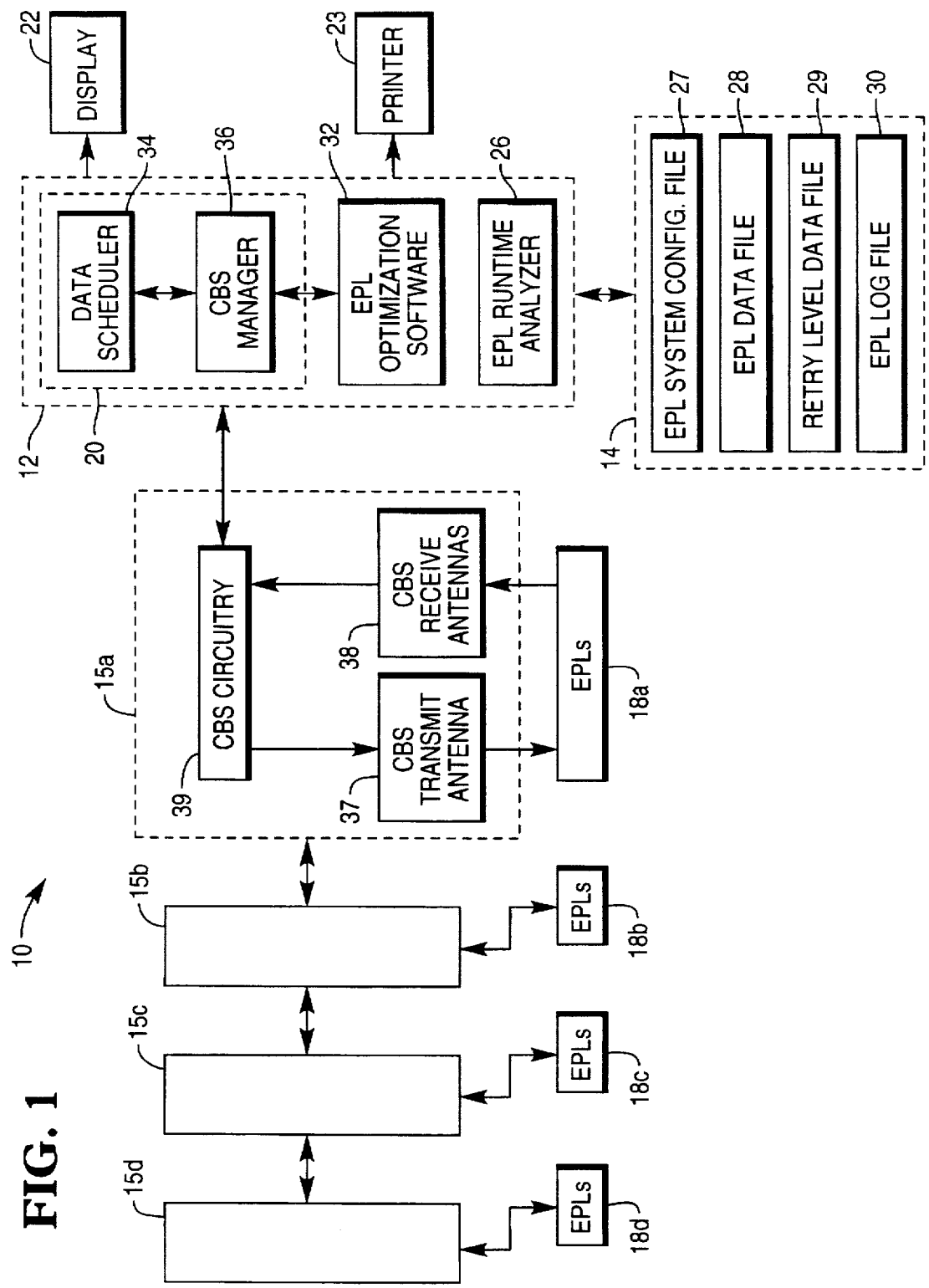
FIG. 1 is a block diagram of an EPL system.

Referring now to FIG. 1, EPL system 10 includes computer 12, storage medium 14, communication base stations (CBSs) 15a–d, electronic price labels (EPLs) 18a–d, display 22, and printer 23.

Computer 12 executes EPL control software 20, EPL runtime analyzer 26, and EPL optimization software 32. EPL control software 20 records, schedules, and transmits all messages to EPLs 18a–d through CBSs 15a–d, and receives and analyzes status messages from EPLs 18a–d through CBSs 15a–d. Such messages include queries to individual EPLs requesting an acknowledgment signal from the individual EPLs. EPL control software 20 also maintains and uses EPL data file 28, which contains item information, identification information, item price verifier information, and status information for each of EPLs 18a–d.

EPL control software 20 primarily includes data scheduler 34 and CBS manager 36. Data scheduler 34 schedules EPL price change messages to be sent to EPLs 18a–d through CBSs 15a–d.

CBS manager 36 schedules the actual transmission of price change messages to EPLs 18a–d and the reception of status messages from EPLs 18a–d for predetermined time slots. In order to schedule transmissions and receptions, CBS manager 36 reads the status flag from EPL data file 28. Although, CBS manager 36 may also receive status information from an executing application. Status flags are organized in accordance with the information in Table I:

TABLE I

| Status Flag | Interpretation |
| --- | --- |
| 0 | EPL is inactive. |
| 1 | 1 send, then 1 receive |
| 2 | 2 sends, then 2 receives |
| 4 | 4 sends, then 4 receives |
| 8 | 8 sends, then 8 receives |
| 16 | 16 sends, then 16 receives |
| 255 | EPL faulty |

Thus, for example, a status flag of "4" tells CBS manager 36 to request all of CBSs 15a–d to transmit a price change to one of EPLs 18a–d in four different time frames. Each frame contains twelve time slots managed by CBS manager 36 and CBSs 15a–d. CBS manager 36 listens for a response from the one EPL in the four time frames. If the response comes into CBS manager 36 in any of the first, second, or third time frames, the remaining time frames are reported. CBS manager 36 writes the number of time frames required to receive a response from the one EPL in EPL log file 30.

CBS manager 36 monitors signal strength and noise information during each response time frame. It records signal-to-noise (S/N) ratio information for each EPL in EPL log file 30 if the first attempt fails.

CBS manager 36 also performs transmission retries if the first transmission attempt fails. CBS manager 36 temporarily promotes the EPL to a higher retry status and attempts to communicate with the EPL again. CBS manager 36 logs a status message following the communication attempt. This status message includes the status (Good or Bad) and S/N ratios for further analysis at a later time by runtime analyzer 26.

Runtime analyzer 26 reads the status flag and S/N data in EPL log file 30 and makes determinations that may result in the status flag of a particular one of EPLs 18a–d being changed. Runtime analyzer 26 determines peak and average S/N ratios for each of EPLs 18a–d, and establishes S/N thresholds and ranges for each status flag. Runtime analyzer 26 reads log file 30 for the measured S/N ratio to determine whether it is too low, and if it is, changes the status flag. To do this, runtime analyzer 26 compares the recorded S/N ratio with a predetermined S/N range associated with the recorded status flag. If the recorded ratio is not within the predetermined S/N range, runtime analyzer 26 determines the correct range and status flag and modifies EPL data file 28 accordingly.

Runtime analyzer 26 is preferably run continuously to reset the system and re-initialize runtime analyzer 26, unless computer 12 is involved within processor-intensive tasks, such as batch processing.

EPL optimization software 32 uses the message retry values for each EPL and location information stored within configuration file 27 to determine areas in the store that interfere with reception of messages by EPLs. EPL system configuration file 27 tells computer 12 how system 10 is configured, i.e., the addresses of EPL system components and there location within transaction establishment relative to other components within system 10, and the location of different types of goods in the system. EPL optimization software 32 reads retry level data from EPL data file 28 and creates EPL retry level data file 29 which EPL optimization software 32 can display or print on display 22 and printer 23.

EPL optimization software 32 may be any data analysis program. The Excel spreadsheet program from Microsoft was used to generate the graphs in FIGS. 5 and 6.

Storage medium 14 is preferably a fixed disk drive. Storage medium 14 stores EPL system configuration file 27, EPL data file 28, EPL retry level data file 29, and EPL log file 30.

CBSs 15a–d are connected together in series. Here, only four CBSs are shown. CBSs 15a–d each include one transmit antenna 37 and up to four receive antennas 38 for transmitting and receiving messages between CBSs 15a–d and EPLs 18a–d. CBSs 15a–d each include CBS circuitry 39 which controls operation of each CBS.

Figure 2:
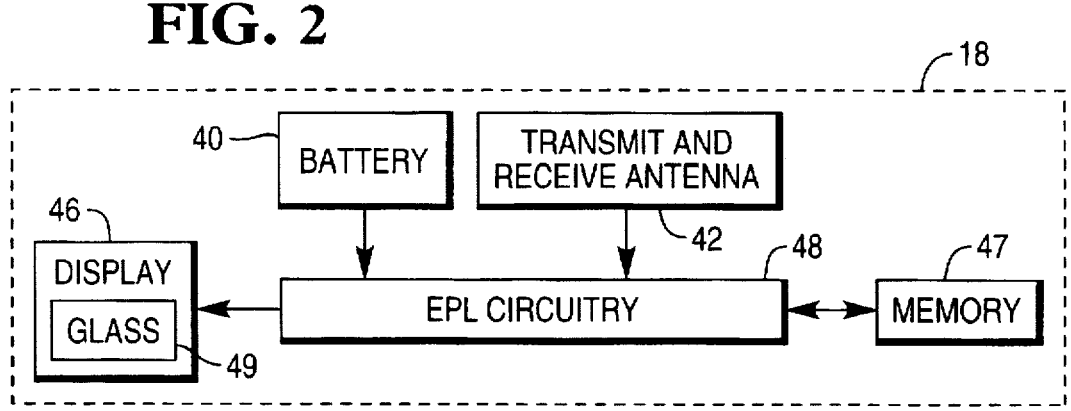
FIG. 2 is a block diagram of an EPL.

Turning now to FIG. 2, EPLs 18a–d each include battery 40, transmit and receive antenna 42, display 46, memory 47, and EPL circuitry 48.

Battery 40 provides power to EPLs 18a–d.

Transmit and receive antenna 42 receives price change and status messages from CBS 15a–d.

Transmit and receive antenna 42 transmits responses to price change and status messages to CBS 15a–d.

Display 46 displays price and possibly additional information. Display 46 is preferably a liquid crystal display and includes glass 49.

Memory 47 stores price verifier information. Preferably, the price verifier information is a checksum of the displayed price.

EPL circuitry 48 controls the internal operation of EPLs 18a–d.

Figure 3:
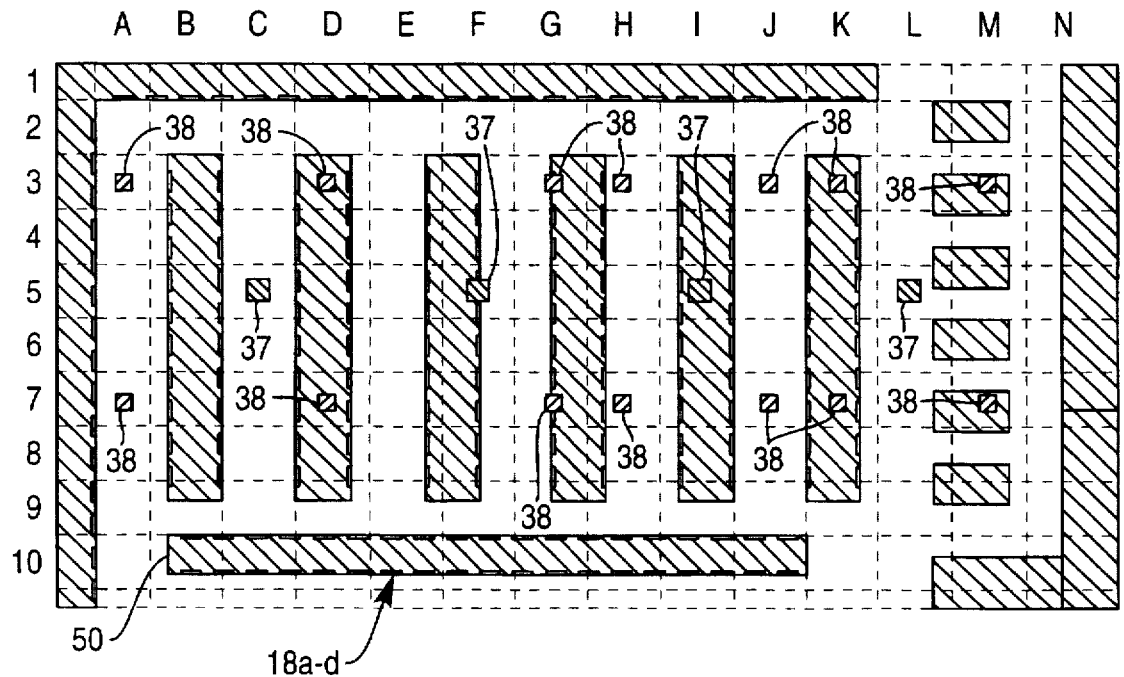
FIG. 3 is an example of a map of a transaction establishment.

Turning now to FIG. 3, a map of a transaction establishment illustrates the location of shelves 50 and EPLs 18a–d.

The locations of EPLs 18a–5d are referenced to a two-dimensional coordinate system in which rows are identified by numerals and columns are identified by letters.

In this example, receive antennas 38 are located at 3A, 7A, 3D, 7D, 3G, 7G, 3H, 7H, 3J, 7J, 3K, 7K, 3M, and 7M. Transmit antennas 37 are located at 5C, 5F, 5I, and 5L.

Figure 4:
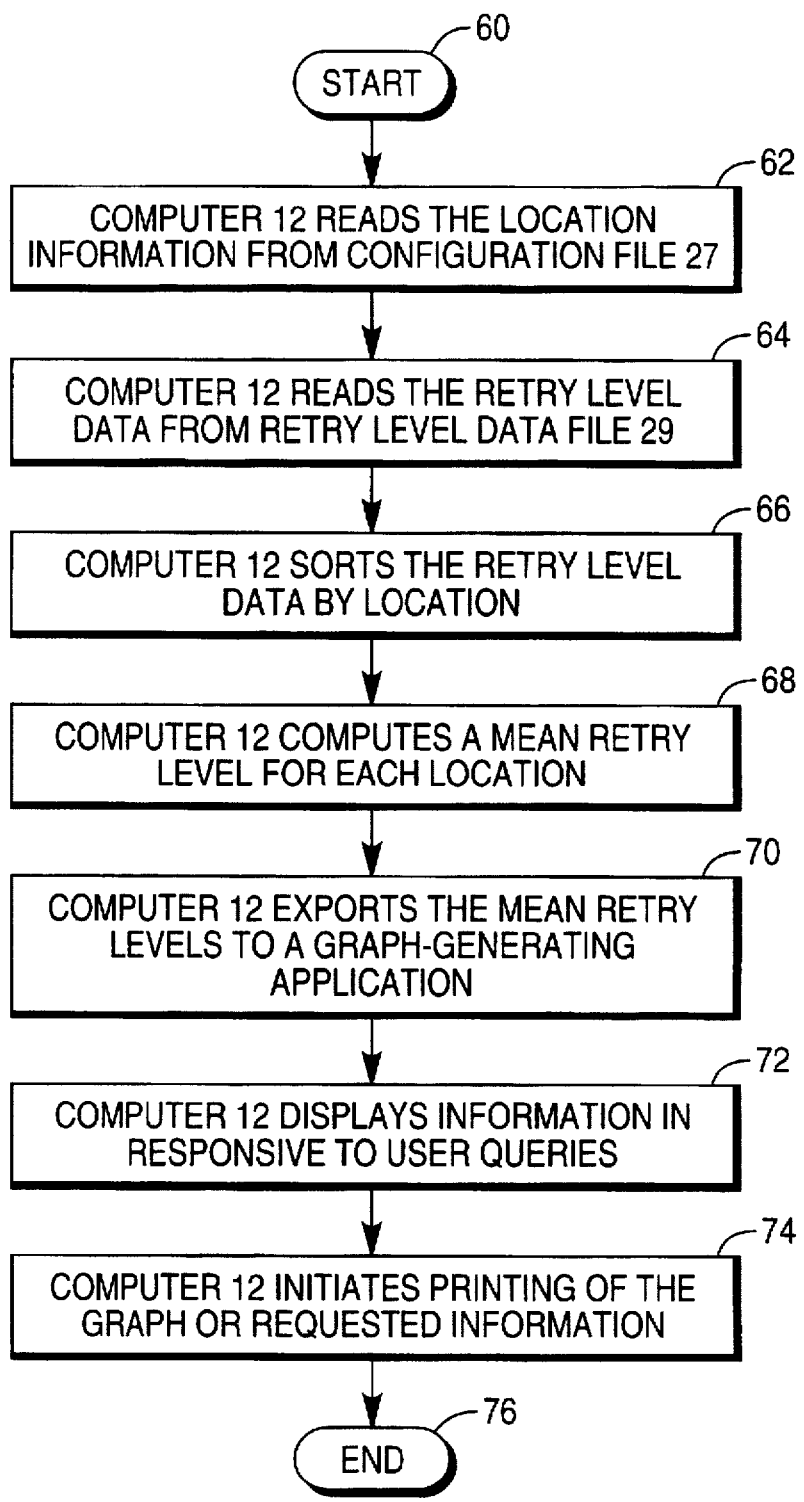
FIG. 4 is a flow diagram illustrating the optimization method.

Turning now to FIG. 4, the operation of EPL optimization software 32 is explained in more detail, beginning with START 60.

In step 62, computer 12 reads the location information from configuration file 27.

In step 64, computer 12 reads the retry level data from retry level data file 29.

In step 66, computer 12 sorts the retry level data by location.

In step 68, computer 12 computes a mean retry level for each location. Computer 12 may also compute a median retry level or some other type of simplified data measure.

In step 70, computer 12 exports the mean retry levels to a graphing application, such as the Graph application from Microsoft that works within the Excel spreadsheet program.

In step 72, computer 12 displays information in response to user queries. These queries may include requests for information, such as a request for the areas having mean retry levels above a predetermined retry level.

Figure 5:
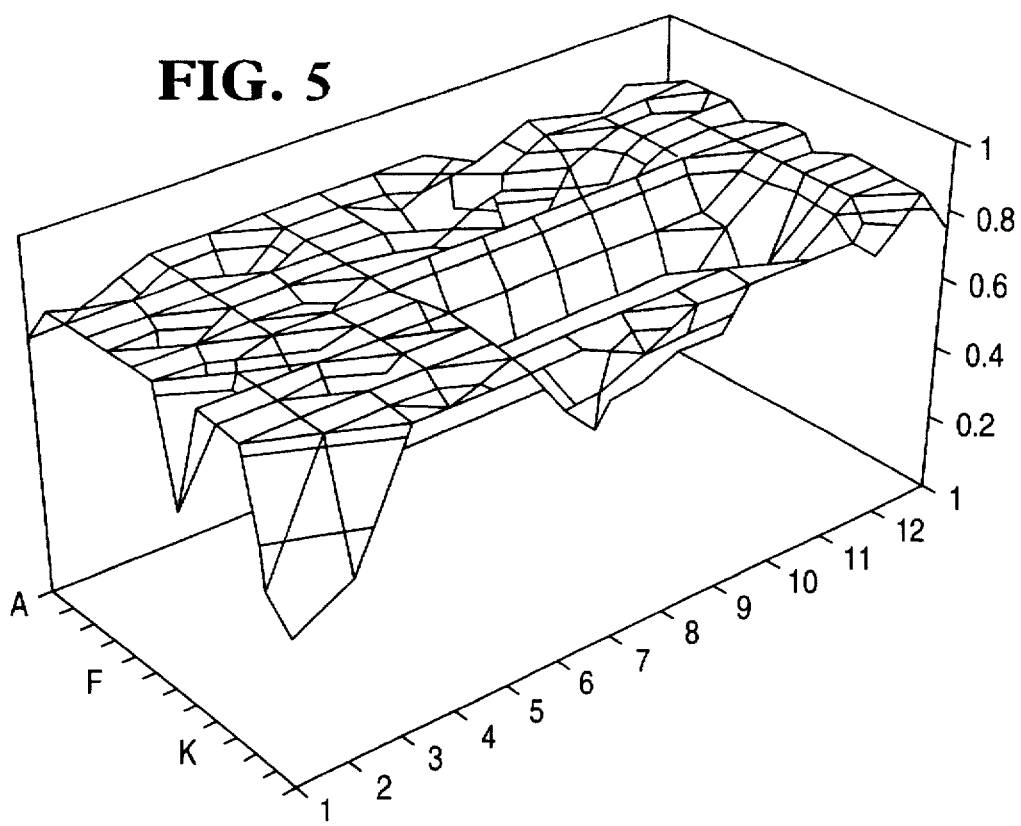
FIG. 5 is a three-dimensional plot generated by EPL optimization software.
Figure 6:
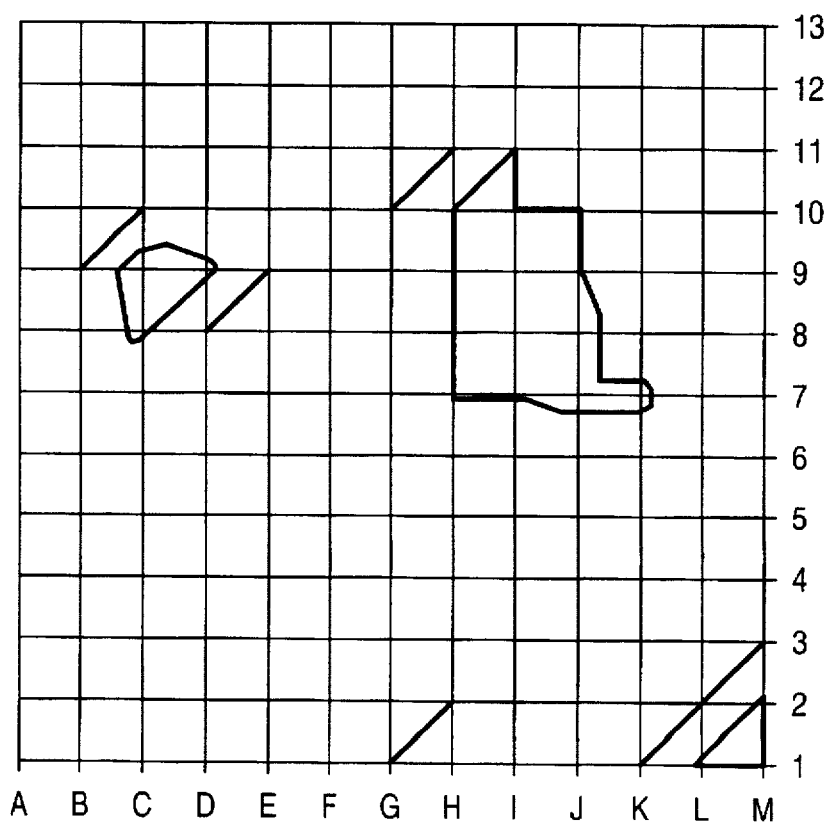
FIG. 6 is a two-dimensional plot generated by EPL optimization software.

EPL optimization software 32 displays the two-dimensional or three-dimensional plots of FIGS. 5 and 6. FIG. 5 is a plot of all of the average retry levels throughout the store. FIG. 6 is effectively a horizontal cross-section of FIG. 5 because it illustrates where a single predetermined retry level is found within the store.

For this purpose, the data can be stored as a spreadsheet file, such as a Microsoft Excel spreadsheet file. The Microsoft Excel spreadsheet program may then be used to generate the two-dimensional or three-dimensional plot from the spreadsheet file.

In step 74, computer 12 initiates printing of the mean retry level graphs of FIGS. 5 and 6 and/or graphs of user-requested information.

A user can examine areas having high retry levels from and make adjustments in the location of the CBS transmit antennas 37 and CBS receive antennas 38. Adjustments may include adding additional CBSs to cover high retry level areas and removing or relocating interfering structures. New retry levels may be calculated and plotted to determine whether the adjustments resulted in lower retry levels in the affected areas. The process continues iteratively until all areas of the store have retry levels below a predetermined maximum retry level.

In step 76, the method ends.

Although the present invention has been described with particular reference to certain preferred embodiments thereof, variations and modifications of the present invention can be effected within the spirit and scope of the following claims.

What is claimed is:

1. A method of optimizing an electronic price label (EPL) system within an area of a transaction establishment comprising the steps of:

determining locations of EPLs within the transaction establishment;

determining locations of transmit and receive antennas that are used by a computer to communicate with the EPLs;

determining retry levels for the EPLs;

mapping the retry levels to locations within the transaction establishment;

producing a three-dimensional graph of the retry levels within the area of the transaction establishment; and determining, from the graph, subareas within the area having retry levels above a predetermined maximum retry level.

2. The method as recited in claim 1, further comprising the step of producing a two-dimensional graph illustrating subareas having a predetermined retry level.

3. The method as recited in claim 1, further comprising the step of:

determining average retry levels for each location within the store after the step of mapping.

4. The method as recited in claim 3, wherein step of producing comprises the substep of:

producing a three-dimensional graph of the average retry levels.

5. The method as recited in claim 1, further comprising the step of:

changing the locations of the transmit and receive antennas.

6. The method as recited in claim 1, further comprising the steps of:

identifying structures responsible for the higher retry levels; and moving the structures to decrease the retry levels of the subareas below the predetermined maximum retry level.

\* \* \* \* \*